United States Patent [19]
Hsu et al.

[11] Patent Number: 5,308,897
[45] Date of Patent: May 3, 1994

[54] DEGRADABLE PLASTICS

[75] Inventors: Hung-Yuan Hsu, Hsinchu; Shu-Chieh Liuo, Keelung; Shu-Fang Jiang, Hsinchu; Jian-Hong Chen, Hsinchu; Ho-May Lin, Hsinchu; Herng-Dar Hwu, Taoyuan; Muh-Lan Chen, Hsinchu; Mao-Song Lee, Hsinchu; Teh Hu, Hsinchu, all of Taiwan

[73] Assignee: Industrial Technology Research Institute, Hsinchu, Taiwan

[21] Appl. No.: 4,548

[22] Filed: Jan. 14, 1993

[51] Int. Cl.⁵ ............................................ C08L 3/00
[52] U.S. Cl. ........................................ 524/47; 523/128; 524/284; 524/296; 524/321
[58] Field of Search ................ 523/128; 524/47, 296, 524/321, 284, 290; 525/220

[56] References Cited

U.S. PATENT DOCUMENTS

| | | | |
|---|---|---|---|
| 3,347,823 | 10/1967 | Buckley et al. | 524/296 |
| 4,016,117 | 4/1977 | Griffin | 260/17.4 ST |
| 4,125,495 | 11/1978 | Griffin | 260/17.4 ST |
| 4,207,221 | 6/1980 | Tobias et al. | 260/28.5 R |
| 5,064,932 | 11/1991 | Chang et al. | 524/284 |

FOREIGN PATENT DOCUMENTS 1487050 9/1977 European Pat. Off. .

*Primary Examiner*—Paul R. Michl
*Assistant Examiner*—LaVonda DeWitt
*Attorney, Agent, or Firm*—Fish & Richardson

[57] ABSTRACT

A composition of matter including a polymeric material which is either a plastic having carbon to carbon linkages or a binary blend of the plastic and starch, in which the plastic is at least 25% by weight of the binary blend; and an organic peracid compound dispersed in the polymeric material, the quantity of the peracid compound being 0.1 to 10% by weight of the polymeric material.

22 Claims, No Drawings

DEGRADABLE PLASTICS

FIELD OF THE INVENTION

The present invention relates to plastic compositions and, in particular, to those which are degradable.

BACKGROUND OF THE INVENTION

Starch-containing biodegradable plastics have been widely commercialized in environmental applications because of their low prices. U.S. Pat. Nos. 4,016,117, 4,207,221 and 4,125,495, as well as British Patent 1,487,050, disclose the technologies of preparing starch-containing biodegradable plastics.

More specifically, U.S. Pat. Nos. 4,016,117 and 4,207,221 teach the addition of low molecular weight compounds, such as unsaturated fatty acids/fatty acid esters and unsaturated wax, to plastic-starch blends. The unsaturated double bonds in the additives can react with transition metal salts in soil and water to initiate auto-oxidation, thereby improving degradability of the plastic-starch blends. However, this approach has a major drawback, i.e., the low molecular weight additives worsens the mechanical properties of the blends.

U.S. Pat. No. 4,125,495 and British Patent 1,487,050, on the other hand, utilize a silane coupling agent or isocyanate as graft-modifier to the starch surface to improve the compatibility of starch and plastics. The mechanical properties of the plastic-starch blends is thus improved. However, modified starch is quite expensive. Furthermore, the biodegradation rates of such blend systems are rather low. Consequently, addition of low molecular weight unsaturated fatty acids/fatty acid esters or unsaturated wax to plastic-starch blends remains in large part the method of choice.

Whether the plastic portion of the starch-containing biodegradable plastics can really degrade is an unsettled issue. The plastic ingredient of conventional starch-containing degradable plastics is supposed to degrade via an auto-oxidation mechanism. However, as a matter of fact, the degradation is too slow to be observed. Some researchers have asserted that the plastic ingredient does not degrade by auto-oxidation and therefore the starch-containing biodegradable plastics are at best destructible, rather than degradable.

In the present invention, the degradability of a plastic is improved by adding thereto a reactive functional compatibilizer, instead of low molecular weight unsaturated fatty acids/fatty acid esters or unsaturated wax. As a result, the mechanical properties only slightly deteriorate, if at all.

SUMMARY OF THE INVENTION

The main object of the present invention is to provide an organic peracid compound as an additive to increase both the biodegradation and photodegradation rates of plastics without considerably impairing its mechanical properties.

Accordingly, this present invention relates to a composition of matter which includes: (1) a polymeric material which is either a plastic having carbon to carbon linkages or a binary blend of the plastic and starch, in which the plastic is at least 25% (e.g., 25-99%) by weight of the blend; and (2) an organic peracid compound which is dispersed in, and is 0.1 to 10% by weight of, the polymeric material. Preferably, the binary blend includes the plastic at 50-99% by weight of the blend and the peracid compound is 0.5 to 10% by weight of the polymeric material.

A plastic having carbon to carbon linkages refers to a synthetic organic polymer/copolymer with chemical bonds between carbons or a blend of two or more of such polymers/copolymers. Typical examples of such a polymer/copolymer include, but are not limited to, polyethylene, polypropylene, poly(1-butene), poly(4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, rubber-modified polystyrene, styrene-butadiene copolymers, styrene-isoprene copolymers, polyvinyl chloride, poly(vinylidene chloride), polyvinyl fluoride, poly(vinylidene fluoride), polyoxymethylene, poly(ethylene oxide), poly(propylene oxide), polyvinyl alcohol, polyvinyl acetate, polyvinyl formal, polyvinyl butyral, poly(-methyl acrylate), poly(ethyl acrylate), poly(caprolactam), poly(hexamethyleneadipamide), poly(ethylene terephthalate), vinyl chloride-vinyl acetate copolymers, cellulose acetate, cellulose propionate, cellulose acetate butyrate, ethyl cellulose, methyl cellulose, hydroxyethyl cellulose, hydroxypropyl cellulose, acrylonitrile polymers and copolymers, and methacrylonitrile polymers and copolymers. Preferred polymers include organic hydrocarbon polymers such as polyethylene, polyvinyl chloride, and polystyrene.

An organic peracid compound is an organic compound which contains one or more peroxy-carboxyl group (i.e., —COOOH).

In the above-described composition of this invention, it is preferred that the peracid compound contain a functional group which can react with a hydroxyl group of starch. Examples of such functional groups include, but are not limited to, a carboxyl group, an aldehyde group, and a cyanate group.

It is also preferred that the peracid compound contain either an aliphatic group with a carbon to carbon double bond or an aromatic group. What is meant by an aromatic group is a substituted or unsubstituted benzoid hydrocarbon group (e.g., benzene, naphthalene, anthracene, diphenyl, and fluorene) or a substituted or unsubstituted heterocyclic hydrocarbon group with aromatic properties (e.g., pyridine, furan, thiophen, and pyrrole).

Other features and advantages of the present invention will be apparent from the following description of the preferred embodiments, and also from the appending claims.

DESCRIPTION OF THE PREFERRED EMBODIMENTS

Polymeric compositions containing hydroxyl groups or carboxyl groups have been found to possess a higher biodegradation rate. The present invention teaches addition of an organic peracid compound to a plastic or a plastic-starch blend to provide functional groups in order to accelerate the photodegradation/biodegradation of the plastic or plastic-starch blend.

For illustrative purposes only, we provide below a formula which covers some preferred peracid compounds which can be used in preparing a polymeric composition of this invention:

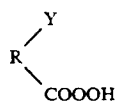

in which R is an aliphatic hydrocarbon moiety containing 1-18 carbons (e.g., —CH=CH— or —CH$_2$—CH$_2$—CH=CH—CH$_2$—CH$_2$—) or an aromatic hydrocarbon moiety containing 6-18 carbons (e.g., an o- or a p-phenylene group); and Y is a functional group capable of reacting with hydroxyl groups (e.g., —COOH or —CHO).

In a starch-containing polymeric composition of this invention, introduction of functional group Y can reinforce the weak plastic/starch interface since that functionality is capable of reacting with a hydroxyl group of the starch to form chemical bonding. Consequently, the mechanical properties of the polymeric composition are superior to those of the conventional starch-containing plastics, which, as discussed above, include low molecular weight unsaturated fatty acids/fatty acid esters or unsaturated wax.

Note that addition of too much peracid will worsen the processability and mechanical properties of the plastic-peracid or plastic-starch-peracid blends. Thus, the amount of peracid added should be carefully controlled so as to increase the degradation rate without substantially impairing the processability and mechanical properties of the blends.

According to the present invention, peracid and plastic and/or starch are blended at high temperature. The peracid and oxygen from the air will oxidize the plastic to form ketone groups. As well known in the art, plastic materials containing ketone groups will undergo photo-degradation via Norrish type I and Norrish type II reaction mechanisms. If the peracid compound contains an aliphatic group with an unsaturated carbon-carbon double bond, the effect of auto-oxidation will be further reinforced since the double bond can react with metal salts in soil or water to initiate auto-oxidation reaction.

Furthermore, after blending under high temperature some peracid will be converted to carboxylic acid, which is capable of catalyzing the hydrolysis of starch. As a result, the starch is inverted to reducing sugar and becomes more digestible to microorganisms, thereby accelerating the degradation of the starch-containing plastics.

Without further elaboration, it is believed that one skilled in the art can, based on the description herein, utilize the present invention to its fullest extent. The specific embodiments described in Examples I-V below are, therefore, to be construed as merely illustrative, and not limitative of the remainder of the disclosure in any way whatsoever.

In the following examples, the compounding temperatures of various plastics were as follows: polystyrene or PS (PG-383 from Chi Mei Industrial Co., Ltd., Taiwan) at 154° C., polyvinyl chloride or PVC (S-65 from Formosa Plastics Corp., Taiwan) at 150° C., polyethylene or PE (NA207-66 from USI Far East Corp., Taiwan) at 140° C.

Corn starch (granular size: 15 μm; fat content: max. 0.4%; and capillary viscosity, Std. II, 5% d.s., at 80° C.: 40~50 sec.) was purchased from Swiss Starch Corporation Taiwan Ltd., Taiwan. COOH·CH=CH·COOOH (hereinafter "aliphatic peracid") and

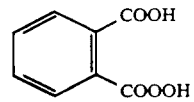

(hereinafter "aromatic peracid"), the two peracids used in the following examples, were synthesized according to the methods described in R. H. White and W. D. Emmons, Tetrahedron. 17:31, (1962); and E. E. Royals and L. L. Harrell, Jr., J. Am. Chem. Soc. 77:3405 (1955), both of which are hereby incorporated by reference. Compounding was performed in two roll mills for 10 minutes. Tensile strength was tested according to the ASTM D638 standard method. Specimens of PS and PVC were type V dumbbell-shaped with a thickness of 1.5 mm. Specimens of PE were type IV dumbbell-shaped with a thickness of 60 μm. 5 to 7 samples were routinely tested for each tensile strength experiment. Biodegradability was tested according to the ASTM G21-70 standard method. Table 1 shows how the observed growth of fungus on specimens was rated. A higher rating reflects greater biodegradability.

TABLE 1

| Observed Growth of Fungus on Specimens | Rating |
|---|---|
| 0% | 0 |
| below 10% | 1 |
| 10~30% | 2 |
| 30~60% | 3 |
| above 60% | 4 |

The tensile strengths and the ratings of fungus growth of various PS-starch blends with different ratios (which are not within the scope of this invention) are shown in Table 2.

TABLE 2

| | Experiment Number | | | | | |
|---|---|---|---|---|---|---|
| | (1) | (2) | (3) | (4) | (5) | (6) |
| Ingredient (gram) | | | | | | |
| PS | 100 | 90 | 80 | 70 | 50 | 25 |
| Starch | — | 10 | 20 | 30 | 50 | 75 |
| Tensile Strength (Kg/cm$^2$) | 554 | 466 | 414 | 368 | 300 | 231 |
| Rating of Fungus Growth (10 days) | 0 | 1 | 1 | 1 | 1 | 4 |
| Rating of Fungus Growth (21 days) | 0 | 1 | 1 | 1 | 2 | 4 |

As shown in Table 2, the starch content in plastic-starch blends should be higher than 50% in order to achieve acceptable biodegradability. On the other hand, gradual increase of the starch content resulted in deterioration of the mechanical properties of plastic-starch blends.

EXAMPLE I

Various polymeric compositions containing aliphatic peracid or unsaturated fatty acid/oil as shown in Table 3 were prepared in a manner described above. PS was used as the plastic component of plastic-starch blends. The content of peracid (as well as unsaturated fatty acid/oil) is expressed herein as % by weight of the polymeric material in which it was dispersed, or parts per hundred resin ("phr"). For example, 0.18 phr peracid means that 0.18 g of that peracid was added to 100 g of a plastic-starch blend or a plastic.

TABLE 3

|  | Experiment Number | | | | | Contrast | |
| --- | --- | --- | --- | --- | --- | --- | --- |
|  | (7) | (8) | (9) | (10) | (11) | (12) | (13) |
| Ingredient (gram) | | | | | | | |
| PS | 90 | 90 | 90 | 90 | 90 | 90 | 90 |
| Starch | 10 | 10 | 10 | 10 | 10 | 10 | 10 |
| Aliphatic peracid | 0.18 | 0.59 | 1.18 | 1.77 | 2.95 | — | — |
| Sunflower oil | — | — | — | — | — | 1.5 | 3 |
| Linolenic acid | — | — | — | — | — | 0.2 | 0.5 |
| Tensile Strength (Kg/cm$^2$) | 387 | 420 | 442 | 385 | 360 | 355 | 322 |
| Rating of Fungus Growth (10 days) | 1 | 2 | 3 | 3 | 3 | — | — |
| Rating of Fungus Growth (21 days) | 1 | 3 | 4 | 4 | 4 | 1 | 3 |

Three conclusions can be reached from the experimental results shown in Table 3:
1. The biodegradability of a plastic-starch blend was enhanced considerably by increasing the content of aliphatic peracid.
2. The tensile strength of a plastic-starch blend could be improved by increasing the content of aliphatic peracid when the content of aliphatic peracid was lower than 1.18 phr.
3. Blends containing aliphatic peracid had better tensile strength and biodegradability than conventional starch-containing plastics containing low molecular weight unsaturated fatty acid and fatty acid ester. Compare results from Experiments (8), (9), (10) or (11) with (12) or (13).

EXAMPLE II

Various plastic-starch blends with or without aliphatic peracid as shown in Table 4 were prepared in a manner described above. PVC or PE was used instead of PS (as in Example I) as the plastic component of plastic-starch blends.

TABLE 4

|  | Experiment Number | | | |
| --- | --- | --- | --- | --- |
|  | (14) | (15) | (16) | (17) |
| Ingredient (gram) | | | | |
| PVC | 90 | 90 | — | — |
| PE | — | — | 90 | 90 |
| Starch | 10 | 10 | 10 | 10 |
| Aliphatic peracid | — | 1.18 | — | 1.18 |
| Tensile Strength (Kg/cm$^2$) | 526 | 508 | 152 | 150 |
| Rating of Fungus Growth (10 days) | 2 | 3 | 1 | 2 |
| Rating of Fungus Growth (21 days) | 2 | 4 | 1 | 3 |

The results clearly show that aliphatic peracid could also increase the biodegradability of both PVC-starch blends and PE-starch blends.

EXAMPLE III

Various starch-free plastic-aliphatic peracid binary blends as shown in Table 5 were prepared in a manner described above. PS or PVC was used as the plastic component of plastic-starch blends. Results in Table 5 show that PS and PVC did not exhibit any biodegradability [Experiments (1) and (23)], while addition of aliphatic peracid invariably enhanced the biodegradability of both PS and PVC [Experiments (18), (19), (20), (21), (22) and (24)].

TABLE 5

|  | Experiment Number | | | | | | | |
| --- | --- | --- | --- | --- | --- | --- | --- | --- |
|  | (1) | (18) | (19) | (20) | (21) | (22) | (23) | (24) |
| Ingredient (gram) | | | | | | | | |
| PS | 100 | 100 | 100 | 100 | 100 | 100 | — | — |
| PVC | — | — | — | — | — | — | 100 | 100 |
| Aliphatic peracid | — | 0.18 | 0.59 | 1.18 | 1.77 | 2.95 | — | 1.18 |
| Rating of Fungus Growth (10 days) | 0 | 0 | 0 | 1 | 0 | 1 | 0 | 0 |
| Rating of Fungus Growth (21 days) | 0 | 1 | 1 | 1 | 1 | 1 | 0 | 1 |

The photodegradability of the plastic-peracid binary blends were also tested according to the ASTM G26-84 standard method. A Corning 7740 glass filter with a thickness of 1.5 mm was used, with an Xenon-Arc lamp being the light source.

The results shown in Table 6 below indicate that addition of aliphatic peracid enhanced the photodegradability of PS and PVC plastics. More specifically, as the content of the peracid was increased, so was the photo-degradability of the composite plastics.

TABLE 6

|  | Experiment Number | | | | | | | |
| --- | --- | --- | --- | --- | --- | --- | --- | --- |
|  | (25) | (26) | (27) | (28) | (29) | (30) | (31) | (32) |
| Ingredient (gram) | | | | | | | | |

TABLE 6-continued

|  | Experiment Number | | | | | | | |
| --- | --- | --- | --- | --- | --- | --- | --- | --- |
|  | (25) | (26) | (27) | (28) | (29) | (30) | (31) | (32) |
| PS | 100 | 100 | 100 | 100 | 100 | 100 | — | — |
| PVC | — | — | — | — | — | — | 100 | 100 |
| Aliphatic peracid | — | 0.18 | 0.59 | 1.18 | 1.77 | 2.95 | — | 1.18 |
| Tensile Strength $(Kg/cm^2)$ | Before exposure | | | | | | | |
|  | 554 | 488 | 451 | 461 | 476 | 459 | 670 | 665 |
|  | Exposure for 300 hours | | | | | | | |
|  | 464 | 467 | 325 | 416 | 402 | 246 | 659 | 444 |
|  | Exposure for 600 hours | | | | | | | |
|  | 460 | 406 | 321 | 270 | 250 | 154 | 419 | 223 |
| The ratio of tensile strength after 600 hours exposure to the original tensile strength before exposure | 0.83 | 0.83 | 0.71 | 0.59 | 0.53 | 0.34 | 0.64 | 0.34 |

EXAMPLE IV

A PS-starch blend and a PS-starch-aliphatic peracid blend as shown in Table 7 were prepared in a manner described above. The concentrations of reducing sugar of both blends were measured after they had been dipped in a buffer solution (3.297 g $Na_2HPO_4 \cdot 7H_2O$ and 12.103 g $NaH_2PO_4 \cdot H_2O$ in 1,000 ml) for 7 days.

TABLE 7

|  | Experiment Number | |
| --- | --- | --- |
|  | (33) | (34) |
| Ingredient (gram) | | |
| PS | 90 | 90 |
| Starch | 10 | 10 |
| Aliphatic peracid | — | 0.89 |
| Reducing sugar concentration after the blends are dipped in buffer solution for 7 days (%) | 0.009 | 0.029 |

Comparison of the results from Experiments (33) (34) shows that addition of aliphatic peracid increased the concentration of reducing sugar which was a product from the hydrolysis of starch. As discussed above, presence of reducing sugar in a polymeric composition will accelerate its degradation, since reducing sugar is more digestible to microorganisms than starch.

EXAMPLE V

Various polymeric compositions containing aromatic peracid as shown in Table 8 were prepared in a manner described above. PS or PVC was used as the plastic component of various blends.

TABLE 8

|  | Experiment Number | | | | | |
| --- | --- | --- | --- | --- | --- | --- |
|  | (1) | (35) | (2) | (36) | (14) | (37) |
| Ingredient (gram) | | | | | | |
| PS | 100 | 100 | 90 | 90 | — | — |
| PVC | — | — | — | — | 90 | 90 |
| Starch | — | — | 10 | 10 | 10 | 10 |
| Aromatic peracid | — | 1.63 | — | 1.63 | — | 1.63 |

TABLE 8-continued

|  | Experiment Number | | | | | |
| --- | --- | --- | --- | --- | --- | --- |
|  | (1) | (35) | (2) | (36) | (14) | (37) |
| Tensile Strength $(Kg/cm^2)$ | 554 | 490 | 466 | 427 | 526 | 515 |
| Rating of Fungus Growth (10 days) | 0 | 1 | 1 | 1 | 2 | 3 |
| Rating of Fungus Growth (21 days) | 0 | 1 | 1 | 2 | 2 | 4 |

The results shown in Table 8 indicate that aromatic peracid, like aliphatic peracid, also improved the biodegradability of both plastic-starch blends [Experiments (36) and (37)] and PS itself [Experiment (35)].

As exhibited by the above illustrative examples, peracid is capable of increasing the biodegradability and photodegradability of both plastics and plastic-starch blends. Since the plastic portion of plastic-starch-peracid blends and plastic-peracid blends degrade, the polymeric compositions of the present invention can degrade completely. In addition, the mechanical properties of the starch-containing plastics which contain peracid are superior to those of the conventional starch-containing plastics which comprise of low molecular weight unsaturated fatty acids/fatty acid esters or unsaturated wax.

OTHER EMBODIMENTS

The above examples merely illustrate the preferred embodiments of the present invention. Many variations thereon may be made without departing from the spirit of the disclosed invention, as will be evident to those skilled in the art, and such variations are intended to come within the scope of what is claimed. Other embodiments are also within the appending claims.

What is claimed is:

1. A composition of matter which comprises:
   a polymeric material selected from the group consisting of (i) a plastic having carbon to carbon linkages and (ii) a binary blend of said plastic and starch, wherein said plastic is at least 25% by weight of said binary blend; and
   an organic peracid compound having a first functional group —COOH dispersed in said polymeric material, the quantity of said peracid compound being 0.1 to 10% by weight of said polymeric material.

2. The composition of claim 1, wherein said peracid compound contains a second functional group capable of reacting with a hydroxyl group.

3. The composition of claim 2, wherein said second functional group is a carboxyl group, an aldehyde group, or a cyanate group.

4. The composition of claim 3, wherein said second functional group is a carboxyl group.

5. The composition of claim 1, wherein said peracid compound contains an aliphatic group with a carbon to carbon double bond or an aromatic group.

6. The composition of claim 2, wherein said peracid compound contains an aliphatic group with a carbon to carbon double bond or an aromatic group.

7. The composition of claim 3, wherein said peracid compound contains an aliphatic group with a carbon to carbon double bond or an aromatic group.

8. The composition of claim 4, wherein said peracid compound contains an aliphatic group with a carbon to carbon double bond or an aromatic group.

9. The composition of claim 1, wherein said polymeric material is a binary blend of said plastic and starch.

10. The composition of claim 9, wherein said plastic is at least 25-99% by weight of said binary blend.

11. The composition of claim 10, wherein said plastic is at least 50-99% by weight of said binary blend.

12. The composition of claim 11, wherein said peracid compound contains a second functional group capable of reacting with a hydroxyl group.

13. The composition of claim 12, wherein said second functional group is a carboxyl group, an aldehyde group, or a cyanate group.

14. The composition of claim 13, wherein said second functional group is a carboxyl group.

15. The composition of claim 11, wherein said peracid compound contains an aliphatic group with a carbon to carbon double bond or an aromatic group.

16. The composition of claim 12, wherein said peracid compound contains an aliphatic group with a carbon to carbon double bond or an aromatic group.

17. The composition of claim 13, wherein said peracid compound contains an aliphatic group with a carbon to carbon double bond or an aromatic group.

18. The composition of claim 14, wherein said peracid compound contains an aliphatic group with a carbon to carbon double bond or an aromatic group.

19. The composition of claim 1, wherein said polymeric material is a plastic having carbon to carbon linkages.

20. The composition of claim 19, wherein said peracid compound contains an aliphatic group with a carbon to carbon double bond or an aromatic group.

21. The composition of claim 1, wherein said peracid compound is 0.5 to 10% by weight of said polymeric material.

22. The composition of claim 21, wherein said plastic is at least 50-99% by weight of said binary blend.

* * * * *